April 10, 1956 — A. HISEY — 2,741,432

SLIDE RULE

Filed June 26, 1953

INVENTOR.
ALAN HISEY
BY Jennings & Carter
ATTORNEYS

United States Patent Office 2,741,432
Patented Apr. 10, 1956

2,741,432

SLIDE RULE

Alan Hisey, University, Ala.

Application June 26, 1953, Serial No. 364,249

5 Claims. (Cl. 235—79.5)

This invention relates to a slide rule and has for an object the provision of a cylindrical type of slide rule which shall have a scale thereon greater in length and more finely subdivided than linear slide rules, thus obtaining greater accuracy and simpler operation thereof.

A more specific object of the invention is to provide a slide rule embodying a cylindrical member carrying a helical scale and a pair of suitable indices for making calculations together with improved means for retaining the scale and the indices in set positions with respect to each other without liability of error due to slippage.

Another object of my invention is to provide a slide rule of the character designated in which the portion of the cylindrical member carrying the scale is out of sliding contact with the other parts of the rule, thus preventing abrasion of the scale.

Another object of my invention is to provide a slide rule of the character designated in which the entire cylinder carrying the scale telescopes within an outer cylinder whereby the scale is protected against damage when not in use.

A further object of my invention is to provide a slide rule of the character designated in which the inner cylinder carrying the scale is adapted to operate within an outer cylinder with a portion of the scale hidden, thereby permitting the use of an opaque outer cylinder.

A still further object of my invention is to provide a slide rule of the character designated which shall be simple of construction, economical of manufaucture and one which readily lends itself to mass production.

As is well known in the art to which my invention relates, the quality of the scale legibility is incompatible with the requirement of a good sliding fit due to the fact that the nature of the surface of the scale does not provide proper frictional engagement between the parts. Also, the quality of the sliding fit of a slide rule varies with weather conditions, causing annoyance by unintentional movement. Furthermore, the scale of the usual linear slide rule is too short for the accuracy required for many calculations, such as the ordinary analytical calculations of a chemist. A linear slide rule having the accuracy required by such calculations would be inconveniently long.

Heretofore difficulties have been encountered in the construction of cylindrical slide rules due to the fact that the operations thereof have depended upon a transparent outer cylinder. If the outer cylinder is formed of glass, it is fragile and broken easily, thus making the same unsuitable for carrying in a pocket or the like. Plastic materials do not make a satisfactory index cylinder for the reason that they are too soft and scratch easily.

To overcome the above and other difficulties I have devised a cylindrical slide rule embodying an outer cylinder which may be formed of an opaque material and an inner cylinder adapted to telescope within one end of the outer cylinder. The innermost portion of the inner cylinder is of a diameter to engage frictionally the inner walls of the outer cylinder. The outermost portion of the inner cylinder is smaller in diameter than the interior diameter of the outer cyinder and surrounding the outermost portion is a helical scale. Two indices are provided on the outer cylinder, one being movable and the other fixed.

A slide rule embodying features of my invention is illustrated on the accompanying drawings forming a part of this application in which.

Figure 1:
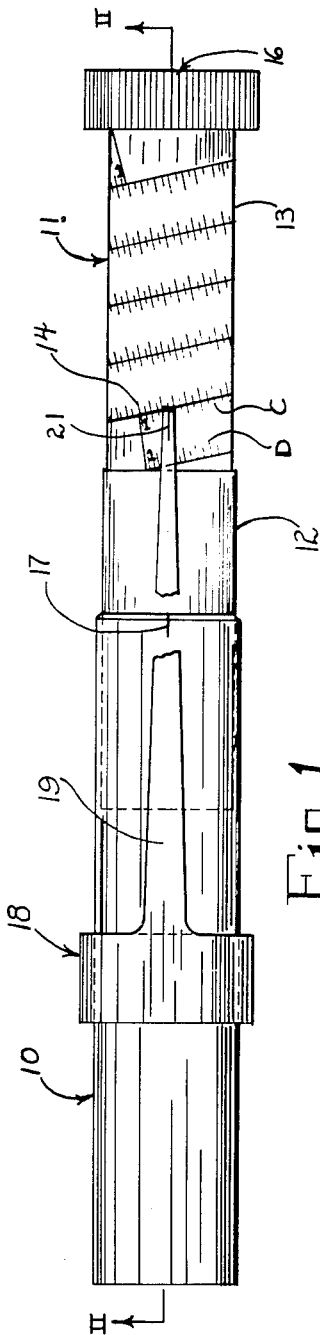
Fig. 1 is an elevational view of the slide rule.
Figure 2:
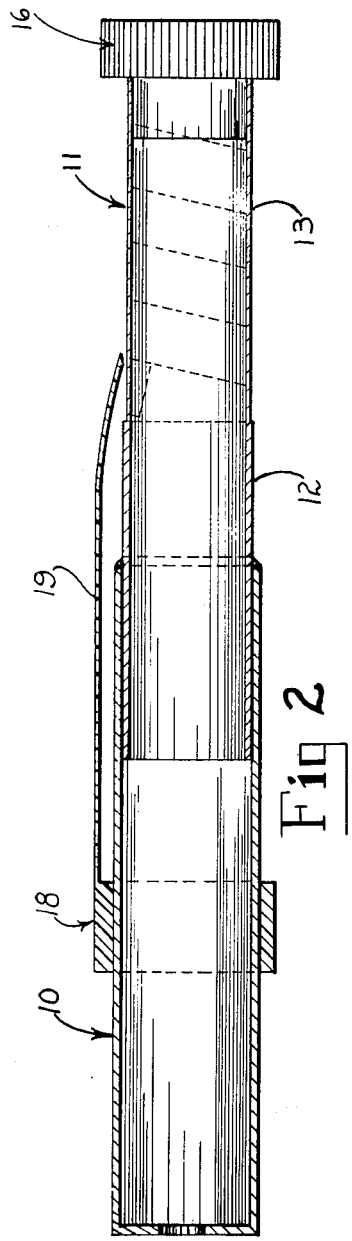
Fig. 2 is a sectional view thereof taken generally along the line II—II of Fig. 1.

Referring now to the drawings for a better understanding of my invention, I show an outer cylindrical member 10. Telescoping within one end of the cylindrical member 10 is an inner cylinder 11. The inner cylinder 11 is provided with an innermost portion 12 of a diameter to engage frictionally the interior surface of the outer cylinder 10 and an outermost portion 13 which is reduced in diameter and comprises substantially half the length of the cylinder 11. Wound about the outermost portion 13 of the inner cylinder is a helical scale 14. The diameter of the portion 13 is reduced to prevent sliding contact between the scale 14 and the inner surface of the outer cylinder 10, thereby preventing abrasion of the scale as the inner and outer cylinders are moved relative to each other.

Secured to the outer end of the inner cylinder 11 by any suitable means is a milled hand grip member 16 for moving the inner cylinder 11 with respect to the outer cylinder 10 which is held in the hand of the operator. The outer cylinder 10 thus forms a handle for the slide rule. An index mark 17 is provided at the end of the outer cylinder 10 adjacent the scale 14. The index mark 17 does not move relative to the outer cylinder 10 thereby forming an independent index, the scale setting of which can only be changed by moving the inner cylinder 11 carrying the scale 14.

Mounted for sliding movement on the outer cylinder 10 is a sleeve member 18 having an elongated pointer 19 projecting therefrom and extending substantially parallel to the longitudinal axis of the cylinders 10 and 11. An index mark 21 is provided at the outer end of the pointer 19 which forms a dependent index overlying the scale 14. The pointer 19 is preferably formed of a transparent material or a relatively small stiff wire so that it will not obstruct the view of the underlying scale 14. The index mark 21 is adapted to be moved relative to the index mark 17, and is held in any set position by the frictional engagement between the sleeve member 18 and the outer cylinder 10. The index mark 17 and the helical scale 14 are held firmly in any set position relative to each other without liability of slippage by the frictional engagement of the innermost portion 12 of the inner cylinder and the inner surface of the outer cylinder 10. Movement of the independent index 17 relative to the scale 14 entails the identical movement of the dependent index 21 without the liability of slippage.

There is no abrasion of the helical scale 14 as the inner cylinder 11 is moved relative to the outer cylinder 10 due to the fact that there is no contact between the scale and the outer cylinder 10. The helical scale 14 is protected further from abrasion in that it is completely out of contact with the fingers of the operator. When the apparatus is not in use, the inner cylinder 11 is telescoped within the outer cylinder 10 thus protecting the entire inner cylinder from accidental damage.

From the foregoing description the operation of my improved slide rule will be readily understood. By employing the usual "C" and "D" scales of the logarithmic type on the rule, multiplication and division are possible, singly or consecutively. To multiply: The multiplicand is set beneath the index mark 17, the index mark 21 is moved to "1" by moving the sleeve 18 along the outer cylinder 10, the multiplier is then brought under the index mark 21 and the product is read under the index mark 17. If the answer is off the scale 14, the other "1" on the scale is moved under the index mark 21 and the product is read beneath the index mark 17.

To divide: The dividend is set beneath the index mark 17, the index mark 21 is moved to the divisor by moving the sleeve member 18 along the outer cylinder 10 (if the divisor is not visable, the index mark 21 is moved to "1" and the other "1" is brought under index mark 21, the index mark 21 is then moved to divisor), "1" is brought under index mark 21 and the quotient is read at the index mark 17.

From the foregoing it will be seen that I have devised an improved cylindrical slide rule which is simple of construction and operation. By providing an inner scale cylinder which projects from only one end of the outer cylinder, and one which is provided with a slightly greater diameter at the innermost end thereof, the desired frictional contact between the moving parts, is obtained without abrasion of the scale. Also, by providing a cylindrical slide rule in which the outer cylinder may be formed by an opaque material, the same may be constructed of relatively strong materials, thus adapting the slide rule for carrying in pockets or the like. Furthermore, by providing a slide rule which is not dependent upon a transparent material for the operation thereof, there is no chance of the slide rule becoming inoperable due to a scratched outer surface.

While I have described only the "C" and "D" logarithmic scales as being employed on my slide rule, it will be apparent to those skilled in the art that many other slide rule scales may be employed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A slide rule comprising an outer cylinder, an inner cylinder telescoping within one end of said outer cylinder with a portion adjacent the inner end of the inner cylinder slidably engaging the inner surface of said outer cylinder, a helical scale surrounding a circumferential portion adjacent the other end of said inner cylinder, the outside diameter of said circumferential portion of the inner cylinder carrying the helical scale being reduced in diameter to prevent contact between said scale and said outer cylinder, an index at the end of said outer cylinder adjacent said scale, and a movable index member engaging said outer cylinder with a sliding fit and projecting over said scale.

2. A slide rule comprising an outer cylinder, an inner cylinder telescoping within one end of said outer cylinder with a portion adjacent the inner end of the inner cylinder engaging the inner surface of said outer cylinder with a sliding fit, a helical scale surrounding a circumferential portion adjacent the other end of said inner cylinder, the outside diameter of said circumferential portion of the inner cylinder carrying the helical scale being smaller than the inside diameter of said outer cylinder to prevent contact between said scale and said outer cylinder, an index at the end of said outer cylinder adjacent said scale, a sleeve member surrounding said outer cylinder with a sliding fit, and an elongated pointer carried by said sleeve member and projecting over said scale to form a second index.

3. A slide rule as defined in claim 2 in which the elongated pointer is formed of a material which serves the purpose of an index without materially obstructing the view of the underlying scale.

4. A slide rule comprising an outer cylinder, an inner cylinder telescoping within one end of said outer cylinder with a portion adjacent the inner end of the inner cylinder engaging the inner surface of said outer cylinder with a sliding fit, a helical scale wound on a circumferential portion adjacent the other end of said inner cylinder, the outside diameter of said circumferential portion of the inner cylinder carrying the helical scale being smaller than the inside diameter of said outer cylinder to prevent contact between said scale and said outer cylinder, a hand grip member at said other end of the inner cylinder, an index member at the end of said outer cylinder adjacent said scale, and a movable index member engaging said outer cylinder with a sliding fit and projecting over said scale.

5. A slide rule comprising an outer cylinder, an inner cylinder telescoping within one end of said outer cylinder with substantially the inner half thereof engaging the inner surface of said outer cylinder with a sliding fit, a helical scale wound on substantially the outer half of said inner cylinder, said outer half of the inner cylinder being reduced in diameter to prevent contact between said scale and said outer cylinder, an index at the end of said outer cylinder adjacent said scale, and a movable index member engaging said outer cylinder with a sliding fit and projecting over said scale.

References Cited in the file of this patent
UNITED STATES PATENTS

| 1,080,811 | Colwell | Dec. 9, 1913 |
| 2,451,842 | Liebmann et al. | Oct. 19, 1948 |
| 2,511,270 | Kahan | June 13, 1950 |

FOREIGN PATENTS

| 183,723 | Great Britain | Aug. 3, 1922 |
| 230,199 | Great Britain | Mar. 12, 1925 |